United States Patent [19]

Surowitz et al.

[11] 4,219,600

[45] Aug. 26, 1980

[54] MOISTURIZING MAT AND PROCESS FOR MAKING THE SAME

[75] Inventors: Philip Surowitz, Middlesex; William L. Wetzel, Piscataway, both of N.J.

[73] Assignee: Chicopee, New Brunswick, N.J.

[21] Appl. No.: 1,801

[22] Filed: Jan. 8, 1979

[51] Int. Cl.² .......................... A01G 7/00; B32B 5/26; B32B 7/14; B32B 27/14
[52] U.S. Cl. .......................................... 428/196; 47/9; 47/18; 47/81; 156/179; 156/181; 156/281; 156/291; 428/198; 428/247; 428/248; 428/249
[58] Field of Search .......................... 47/9, 18, 25, 81; 128/287, 290 R, 296; 428/247, 248, 249, 196, 198; 156/179, 181, 281, 291

[56] References Cited

U.S. PATENT DOCUMENTS

| | | | |
|---|---|---|---|
| 2,157,340 | 5/1939 | Jones | 47/81 |
| 2,243,857 | 6/1941 | Fischer | 47/9 |
| 3,888,041 | 6/1975 | Geith et al. | 47/9 |
| 3,939,606 | 2/1976 | Vandemark | 47/9 |
| 4,001,968 | 1/1977 | Green | 47/9 |
| 4,036,234 | 7/1977 | Ishizuka | 128/290 R |
| 4,050,463 | 9/1977 | Schaar | 128/287 |
| 4,062,145 | 12/1977 | Gidge | 47/9 |
| 4,068,666 | 1/1978 | Shiff | 128/296 |
| 4,077,410 | 3/1978 | Butterworth et al. | 128/287 |
| 4,128,686 | 12/1978 | Kyle et al. | 128/290 R |

*Primary Examiner*—James C. Cannon
*Attorney, Agent, or Firm*—Charles J. Metz

[57] ABSTRACT

A moisturizing mat, and process for making it, are disclosed. The moisturizing mat is suitable for use as a base to promote trickle watering of plants in greenhouses. The mat comprises a wood pulp/fabric layer having an impervious plastic film backing layer. The moisturizing mat is produced by a process including the steps of (a) depositing wood pulp on a first fibrous layer, (b) placing a second fibrous layer on top of the wood pulp, (c) bonding the product of step (b), and (d) bonding an impervious plastic film to one face of the product of step (c).

10 Claims, 3 Drawing Figures

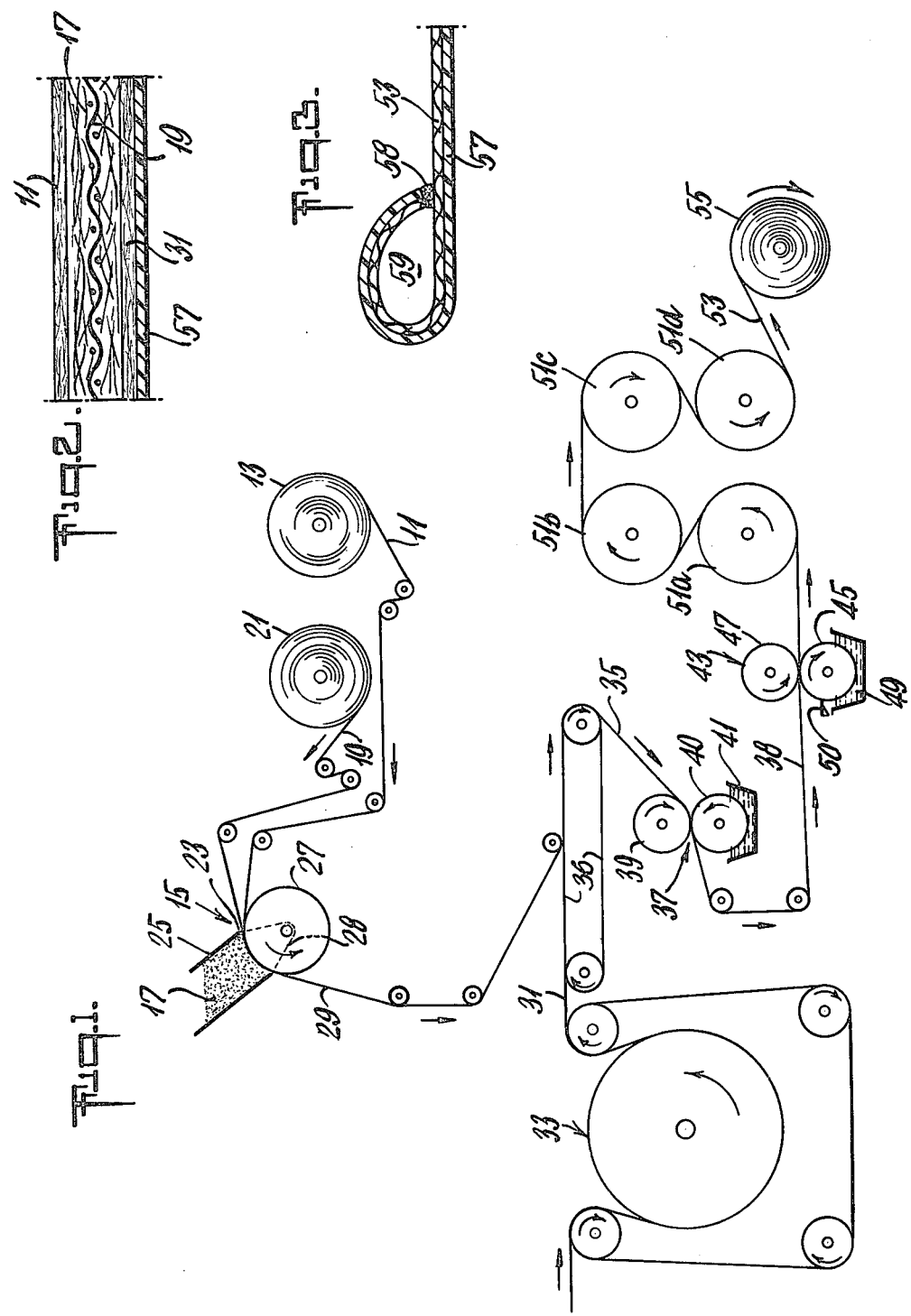

MOISTURIZING MAT AND PROCESS FOR MAKING THE SAME

The invention relates to a moisturizing mat suitable for use as a base to promote trickle watering of plants in a greenhouse, and to a process for making said mat.

BACKGROUND OF THE INVENTION

Moisturizing mats, or capillary bench-mattings, are beginning to gain wide acceptance for horticultural uses. Such mats are used in the following manner:

Many young plants or seedlings are nurtured in synthetic soil that has only a limited water-holding capacity. Flooding of the roots of the young plants is thereby avoided. Such plants are placed in containers that have holes in the bottoms, and the containers are placed on top of the moisturizing mat. Water is continually trickled onto the mat, and is wicked from the mat up into the containers containing the plants.

The February 1978 issue of "Nonwovens Industry" on page 16, discloses one such moisturizing mat that is made of needlepunched nylon backed with a woven polypropylene web. This is typical of the moisturizing mats currently employed commercially. Such mats are usually employed in combination with a separate plastic film to prevent leakage.

The moisturizing mats used heretofore have usually been made from synthetic fibers. A major reason for this is that synthetic fibers are less susceptible to attack from microorganisms than are cellulosic or other natural fibers. However, cellulosic fibers have several advantageous properties that would be desirable in this end-use application. First, they are generally less expensive than synthetic fibers, and, second, they inherently have excellent water carrying capacity.

SUMMARY OF THE INVENTION

The present invention is directed to the provision of a moisturizing mat composed of cellulosic fibers. The moisturizing mat of the invention comprises a wood pulp/fabric layer having an impervious plastic film backing layer.

The moisturizing mat of the invention is produced by a process which includes the steps of:

(a) depositing individualized wood pulp fibers on a first fibrous layer to form a first web having wood pulp fibers on one surface and said first fibrous layer on the other surface;

(b) placing a second fibrous layer on said one surface of said first web to form a second web;

(c) bonding said second web to form a bonded web; and (d) bonding an impervious plastic film to one surface of said bonded web.

BRIEF DESCRIPTION OF THE DRAWINGS

FIG. 1 is a cross-sectional, partially schematic view of an arrangement of apparatus suitable for carrying out the process of the invention;

FIG. 2 is an idealized, enlarged cross-sectional view of one embodiment of the moisturizing mat of the invention; and FIG. 3 is an idealized, enlarged cross-sectional view of another embodiment of the moisturizing mat of the invention.

DESCRIPTION OF THE PREFERRED EMBODIMENTS

Referring first to FIG. 1, there is shown an arrangement of apparatus that is suitable for carrying out the process of the invention. A layer of print-bonded nonwoven rayon fabric 11 ("pre-bond") is fed from a supply roll 13 to a station, shown generally as 15, wherein wood pulp fibers 17 are deposited on one surface of the pre-bond 11. As shown in the drawing, a reinforcing web 19 is fed from a supply roll 21 to form a two layer web 23 at or before the wood pulp fiber depositing station 15. The principal purpose for using the reinforcing web 19 is to provide added strength and stability to the product.

At the wood pulp fiber depositing station 15, the individualized wood pulp fibers 17 are deposited on top of the two layer web 23 from a pulp depositing horn 25, such as is shown in U.S. Pat. No. 3,575,472, to Brewster et al. The two layer web 23 passes around a rotating vacuum drum 27 that is arranged and constructed such that a vacuum chamber 28 is positioned under the two layer web 23 at the location of wood pulp fiber deposit.

After the two layer web 23 has the individualized wood pulp fibers 17 deposited thereon to form a second web 29, a wet, unbonded nonwoven rayon fabric web 31 from a fluid rearranging unit 33 (such as is described by Kalwaites, in U.S. Pat. No. 2,862,251) is then placed on the wood pulp fiber surface of the second web 29 to form a third web 35. The third web 35 then proceeds by suitable means, such as an endless belt conveyor 36, to a wetting station 37 composed of a pair of counterrotating rolls 39, 40, the bottom roll 40 of which is partially immersed in a supply of water 41. The pupose of wetting and squeezing the third web 35 at the wetting station 37 is to make the web 35 more receptive to print bonding adhesive. After the wetting station 37, the wet web 38 proceeds to a print bonding station 43 composed of a pair of counterrotating rolls 45, 47. The bottom roll 45 is engraved and the top roll 47 is smooth. The bottom roll 45 picks up aqueous binder mixture in a reservoir 49, is wiped by a doctor blade 50, and applies the binder onto the web 38 in a predetermined spaced, intermittent pattern defined by the engraving on the roll 45. After the binder has been added at the print bonding station 43, the web with wet binder printed thereon is passed over a set of drying cans 51a, b, c, d in order to dry the web to produce the basic coherent fabric 53 that is employed in producing the moisturizing mat of the invention. (As used herein, the term "coherent", as applied to a fabric, means that the fabric has sufficient strength to be self-supporting and to hold together firmly under normal handling conditions.)

The fabric 53 is collected on a suitable wind-up 55. The fabric 53 is then extrusion coated with polyethylene by procedures (not shown) that are well known in the art. It is preferred to extrusion coat the layer of polyethylene film onto the face of the fabric 53 that is composed of the nonwoven web 31 that had been unbonded when it was added to the web 29 composed of the two layer web 23 plus the individualized wood pulp fibers 17. The reason for this is that, as a general rule, the pre-bond fabric layer 11 has slightly better abrasion resistance than the initially unbonded web 31.

As the first fibrous layer 11, there can be employed a so-called "MASSLINN" nonwoven fabric, some of which are described in greater particularity by Petterson et al. in U.S. Pat. No. 2,705,687, and by Ness et al., in U.S. Pat. No. 2,705,688, or the so-called "KEYBAK" bundled nonwoven fabrics, some of which are described by Kalwaites in U.S. Pat. Nos. 2,862,251 and 3,033,721. It is preferred that the first fibrous layer 11 be a coherent fabric. Nonwoven fabrics such as MASSLINN or KEYBAK can be made coherent by print bonding with intermittent or continuous straight or wavy lines, or discrete area of binder extending generally transversely or diagonally across the web, and additionally, if desired, along the fibrous web. Such intermittent print bonding is well known in the art, an early disclosure of which is Goldman, U.S. Pat. No. 2,039,312, and a latter disclosure of which is Drelich et al., U.S. Pat. No. 3,009,822.

The first fibrous layer 11 can also be made coherent without bonding by employing the process of Evans, in U.S. Pat. No. 3,494,821. The first fibrous layer 11 can also be an open weave woven cotton or rayon fabric, or other coherent fabric.

It is preferred to make the first fibrous layer 11 from rayon fibers in order to ensure maximum absorbency of the moisturizing mat product of the invention. Other types of fibers can be used, however, if desired.

The reinforcing web 19 can be an open weave scrim, or it can be a plastic netting product such as is described in Kalwaites, U.S. Pat. No. 4,013,752.

The second fibrous layer 31 can be a card web or an unbonded bundled nonwoven fabric such as is described by Kalwaites in U.S. Pat. Nos. 2,862,251 and 3,033,721. It can also be a coherent fabric layer, although this is less preferred for economic reasons. It is preferred that this second fibrous layer 31 also be made from rayon fibers, although other fibers can be used if desired.

The binder composition that is applied to the web at the print bonding station 43 can be an aqueous latex binder such as is well known in the art. Such binders are described in the Drelich et al. patent mentioned above (U.S. Pat. No. 3,009,822).

FIG. 2 shows an idealized, enlarged, cross-sectional view of the moisturizing mat 56 made by the process described above. In this embodiment of the invention, the polyethylene film 57 is shown bonded to the surface that had originally been the unbonded, wet, nonwoven web 31 (ie, the second fibrous layer).

It is preferred that the first fibrous layer 11 be black or other dark color in order to minimize algal growth in the final product. Such growth is stimulated by light.

In a preferred embodiment of the invention, the moisturizing mat product of the invention is impregnated with an antimicrobial agent. Such agents will help to preserve the moisturizing mat against attack by bacteria, mold, algae, fungi, and the like. A typical useful antimicrobial agent is the sodium salt of pentachlorophenol. The antimicrobial agent can be added to the web 53 by conventional procedures, such as by padding an aqueous solution of the antimicrobial agent onto the web, and then drying it. The sodium salt of pentachlorophenol can be insolubilized to make it more permanent by passing the dried, impregnated fabric through dilute acid (such as acetic acid), to neutralize the sodium salt, and then drying the web. Another way to make the antimicrobial agent more permanent is to apply it in a mixture with a binder, as is illustrated in the Example below.

In another preferred embodiment of the invention, as is shown in FIG. 3, an edge of the moisturizing mat is folded over and sealed with adhesive 58 to form a conduit 59 for water. Small holes are punched in the conduit 59 so that water can trickle from the conduit 59 onto the mat 56.

The following example illustrates the practice of the invention:

EXAMPLE

A base fabric is produced by the following procedure, using an apparatus as shown in FIG. 1:

A print-bonded, black, bundled nonwoven rayon fabric 11 made by the process of Kalwaites, U.S. Pat. No. 2,862,251, and weighing 240 grains per square yard, is continuously fed from a supply roll 13 to a pulp depositing station 15. A polypropylene netting 19 (as described by Kalwaites, U.S. Pat. No. 4,013,752) weighing 45 grains per square yard is fed on top of the nonwoven fabric just before the pulp depositing station. Individualized wood pulp fibers are deposited in an amount of 603 grains per square yard from a horn 25 on top of the nonwoven fabric/netting layer. A vacuum chamber 28 in a rotating vacuum drum 27 compacts the wood pulp fibers enough to permit the travelling web 29 to turn upside down (as is shown schematically in FIG. 1) without significant loss of wood pulp fibers.

An unbonded, wet nonwoven rayon fabric web 31 having a dry weight of 200 grains per square yard, is fed continuously from a fluid rearranging unit such as is described by Kalwaites in U.S. Pat. No. 2,862,251. The wet web 31 is mated with the travelling web 29 on the wood pulp fiber face, as is shown in FIG. 1, to form a third web 35. The third web is run through a wetting station, is print bonded with "HYCAR" 2671 aqueous latex (in an amount 155 grains per square yard, dry weight), dried over drying cans, and is collected on a standard wind-up. HYCAR 2671 is a self-curing acrylic aqueous latex.

(a) A first portion of the base fabric described above is run through a padder similar to the wetting station shown as 37 in FIG. 1 where it is impregnated with a 1 weight per cent aqueous solution of sodium pentachlorophenate. The wet pick-up is 150 weight per cent.

The thus impregnated base fabric is first dried, and then passed through dilute aqueous acetic acid at a pH of 5, to neutralize and insolubilize the pentachlorophenol. The fabric is then dried.

(b) The remaining portion of the base fabric is passed through a 1 weight per cent aqueous solution of "Sanitized OA-P" plus 2 weight per cent HYCAR 2600×120 latex. Sanitized OA-P is an organic metal salt antimicrobial agent. HYCAR 2600×120 is an acrylic latex. The impregnated fabric is then dried on drying cans.

The two base fabrics (a) and (b) impregnated with antimicrobial agents are both extrusion coated with a 1.5-mil layer of black polyethylene film. (The polyethylene is coated on the face that had been the unbonded nonwoven fabric web 31.)

Both fabrics (a) and (b) were tested as moisturizing mats for trickle watering of plants in a greenhouse. The mats were compared with two commercial products. The conclusion was that the moisturizing mats of this invention can be used as an effective potted plant irrigation system with proper management. The flow rate of water to the mat is preferably adjusted so that there is no runoff, which would be at a lower rate than the two commercial products (which are much thicker, and therefore can hold more water). Compared with the commercial products, the subject mat is advantageous in having the least algae accumulation and in not requiring a plastic sheet underneath the mat. The two commercial moisturizing mats were made from synthetic fibers.

What is claimed is:

1. A moisturizing mat suitable for use as base to promote trickle watering of plants which comprises a first layer of wood pulp fibers contained between a second fibrous facing layer and a third fibrous backing layer, said first, second, and third layers being bonded to form a coherent fibrous layer, and a layer of water-impervious plastic film bonded to said coherent fibrous layer on the surface formed by said third fibrous backing layer.

2. The moisturizing mat of claim 1 wherein said first layer contains a plastic netting or an open-weave fibrous reinforcement.

3. The moisturizing mat of claim 1 or 2 wherein said coherent fibrous layer is bonded by spaced, discrete binder sites that extend substantially through said coherent fibrous layer from said second layer to said third layer.

4. The moisturizing mat of claim 3 wherein said second fibrous facing layer is derived from a print-bonded, bundled, nonwoven fabric and wherein said third backing layer is derived from an unbonded nonwoven fibrous web.

5. The moisturizing mat of claim 4 wherein said second and third fibrous layers are composed of rayon fibers.

6. The moistuizing mat of claim 5 wherein said mat contains an antimicrobial agent.

7. Process for producing a moisturizing mat suitable for use as a base to promote trickle watering of plants which comprises the steps of:
   (a) depositing individualized wood pulp fibers on a first fibrous layer to form a first web having wood pulp fibers on one surface and said first fibrous layer on the other surface;
   (b) placing a second fibrous layer on said one surface of said first web to form a second web;
   (c) bonding said second web to form a coherent fibrous layer; and
   (d) bonding a water-impervious plastic film to one surface of said coherent fibrous layer.

8. The process of claim 7 wherein a plastic netting or an open weave fibrous reinforcing layer is superimposed on said first fibrous layer prior to or during step (a) so that said reinforcing layer will be enveloped by said wood pulp fibers.

9. The process of claims 7 or 8 wherein said coherent fibrous layer is impregnated with an antimicrobial agent.

10. The process of claims 7 or 8 wherein said first fibrous layer is a coherent fabric layer and wherein said second fibrous layer is an unbonded nonwoven fibrous web.

* * * * *